UNITED STATES PATENT OFFICE.

OSCAR KNECHT, OF BASEL, SWITZERLAND, ASSIGNOR TO CHEMICAL WORKS, FORMERLY SANDOZ, OF BASEL, SWITZERLAND.

PROCESS FOR THE PRODUCTION OF BLUE SULFUR DYES.

1,302,671. Specification of Letters Patent. Patented May 6, 1919.

No Drawing. Application filed December 14, 1918. Serial No. 266,834.

*To all whom it may concern:*

Be it known that I, OSCAR KNECHT, of 60 Fabrikstrasse, Basel, Switzerland, have invented a certain new and useful Improved Process for the Production of Blue Sulfur Dyes, of which the following is a specification.

This invention relates to an improved process for the manufacture of blue sulfur dyes.

It is well known, that certain alphyl-para-amido-para-oxy-dialphylamido compounds as well as the corresponding indophenols when treated with polysulfids are transformed into blue sulfur dyes.

My invention is based on the discovery that the same parent materials in mixture with paranitroamido-benzene compounds, containing no hydroxylic group, when treated with polysulfid under suitable conditions yield blue sulfur dyes, which are in general similar to the corresponding dyestuffs obtained without the addition of a nitroamido compound, but are superior to them, both in fastness and purity of the shade as well as by their intensity. Thus the presence of the paranitroamido compounds appear to avoid the formation of secondary products of a dull tint and with inferior coloring capacity.

In carrying out the invention, the following substances have been found to give good results: the alphyl-p-amido-p'-oxydiphenylamines, the p-oxy-p'-amido-m'-alkyl-diphenylamins, the di-alkyl-p-amido-p'-oxydiphenylamins, the indophenols and their respective reduction products, obtained by condensation of nitrosophenols with carbazol or its derivatives, and the like.

Among the p-nitro-amido-benzene compounds, containing no hydroxyl group, the following may be employed with advantage: the p-nitro-anilin, the m-nitro-o-toluidin $CH_3:NH_2:NO_2 = 1:2:5$, the dichloro-p-nitranilin $NH_2:Cl:NO_2:Cl = 1:2:4:6$, the p-nitrodimethylanilin, the p-nitranilin-o-sulphonic acid $NH_2:SO_3H:NO_2 = 1:2:4$, and other analogous substances.

Example I: 13.8 parts of the leucoindophenol phenyl-p-amido-p'-oxydiphenylamin and 8 parts of p-nitranilin are dissolved in a hot solution of polysulfid obtained from 6.6 parts of sodium sulfid 60/62%, 3.2 parts of sulfur and 100 parts of methylic- or ethylic alcohol. The solution after having been filtered is heated for 48 hours under pressure (6 to 8 atmospheres) at a temperature of 120 to 125 centigrades; then the alcohol is driven off by distillation; the residue which is in the form of a liquid paste is dissolved in hot water, and the dyestuff is isolated by precipitating it by acetic acid or by blowing a current of air into the solution.

After filtration, washing and drying, the dyestuff forms a deep blue powder, having a cuprous luster. It is practically insoluble in water and alcohol. In strong sulphuric acid and in cold anilin and pyridin it dissolves with blue color. The dyestuff dissolves readily in a hot solution of sodium sulfid, forming a leuco derivative; this solution dyes unmordanted cotton at first in clear grayish green tints, which on exposure to the air, are rapidly developed into a bright indigo blue.

Example II: 21.4 parts of the leucoindophenol p-oxy-p'-amido-m'-methyl-diphenylamin and 16 parts of p-nitranilin are added to a solution of polysulfid formed by boiling 13.2 parts of sodium sulfid 60/62% strength, 6.4 parts of sulfur and 40 parts of water. The water is driven off by distillation until the boiling point reaches 108–110 C. and then the solution is heated to that point on the reflux condenser for 24 hours, stirring all the time in any suitable manner. The liquid paste thus obtained is dissolved in hot water and the dyestuff is isolated as described in Example I.

The thus produced dyestuff forms a deep blue powder with a cuprous luster and is almost insoluble in water and alcohol. Sulfuric acid and also pyridin dissolve it with blue color, hot anilin with violet color. From a bath containing sodium sulfid it dyes unmordanted cotton at first a clear gray, which by exposure to air is rapidly transformed into a deep indigo blue.

Example III: A solution of 6.6 parts of sodium sulfid of 60/62% strength, 3.2 parts of sulfur in 100 parts of methylic alcohol on addition of 14.5 parts of the leucoindophenol phenyl-p-amido-p'-oxy-m'-methyl-diphenylamin and 12 parts of dichloro-nitranilin $NH_2:Cl:NO_2:Cl = 1:2:4:6$, is heated under pressure (6 to 8 atmospheres) for 48 hours at a temparture of 120–125 C. until the formation of the dyestuff is completed. The methylic alcohol having been distilled off, the residue is dissolved in hot water and a mixture of the leuco derivative of the dyestuff and of dichloro-p-phenylenediamin formed during the process is precipitated by carefully neutralizing the solution by acetic acid. By repeated extractions with diluted hot hydrochloric acid the dyestuff is obtained in form of a deep blue powder almost insoluble in water and alcohol. It dissolves in sulfuric acid, in anilin and in pyridin, giving a blue solution. In a bath containing sodium sulfid it dyes unmordanted cotton a clear brownish-gray which by exposure to the air is developed into a reddish indigo blue.

It will readily be understood by those acquainted with this art, that some of the details given in the above examples may be variously modified without departing from the scope of the invention, and without fundamentally altering the character of the dyestuffs produced. For example, variations may be made in the proportions of the substances mentioned, in the temperature at which, or between which, the process should be carried out, and in the precise nature of the solvents employed; also the reaction, especially as regards Example II may be carried out in a closed receptacle.

What I claim is:—

1. The herein described process for the production of blue sulfur dyes which consists in treating a mixture of leucoindophenols and of nonhydroxylated paranitroamido compounds of the benzene series with polysulfids.

2. The herein described process for the production of blue sulfur dyes which consists in treating a mixture of an alphylparaamidoparaoxydialphylamido compound and a nonhydroxylated paranitroamido compound of the benzene series with polysulfid.

3. The herein described process for the production of a blue sulfur dye, which consists in treating a mixture of phenyl-p-amido-p'-oxydiphenylamin and p-nitranilin with polysulfids.

4. As a new article of manufacture the blue sulfur dyes prepared from a mixture of a leucoindophenol and a non-hydroxylated paranitroamido compound of the benzene series by treatment with polysulfids, which dyestuffs form in dry state a blue powder, practically insoluble in water and alcohol, dissolving in concentrated sulfuric acid, anilin, and pyridin, with blue color and dyeing unmordanted cotton from a bath containing sodium sulfid in bright indigo shades.

In testimony whereof I have signed my name to this specification.

OSCAR KNECHT.

Witnesses:
H. H. Dick,
Melchior Boeniger.